US011889263B2

(12) United States Patent
Sonifrank

(10) Patent No.: US 11,889,263 B2
(45) Date of Patent: Jan. 30, 2024

(54) SPACE SHADED CONSTANT BEAMWIDTH TRANSDUCER

(71) Applicant: Paul Sonifrank, Harrisonburg, VA (US)

(72) Inventor: Paul Sonifrank, Harrisonburg, VA (US)

( * ) Notice: Subject to any disclaimer, the term of this patent is extended or adjusted under 35 U.S.C. 154(b) by 0 days.

(21) Appl. No.: 17/404,981

(22) Filed: Aug. 17, 2021

(65) Prior Publication Data

US 2022/0060817 A1 Feb. 24, 2022

Related U.S. Application Data

(60) Provisional application No. 63/067,618, filed on Aug. 19, 2020.

(51) Int. Cl.
*H04R 1/40* (2006.01)
*H04R 3/12* (2006.01)
*H04R 1/22* (2006.01)

(52) U.S. Cl.
CPC ............. *H04R 1/403* (2013.01); *H04R 1/227* (2013.01); *H04R 3/12* (2013.01); *H04R 2430/20* (2013.01)

(58) Field of Classification Search
CPC .......... H04R 1/403; H04R 1/227; H04R 3/13; H04R 2430/20; H04R 1/40
USPC ............................. 381/59, 89, 304–305, 336
See application file for complete search history.

(56) References Cited

U.S. PATENT DOCUMENTS

| | | | | |
|---|---|---|---|---|
| 7,684,574 B2 * | 3/2010 | Keele, Jr. | H04R 1/403 | 381/160 |
| 8,170,223 B2 * | 5/2012 | Keele, Jr. | H04R 3/12 | 381/59 |
| 9,414,152 B2 * | 8/2016 | Fincham | H03G 3/007 | |

* cited by examiner

*Primary Examiner* — Disler Paul

(57) ABSTRACT

A loudspeaker described herein have a radiation pattern which is constant over a wide frequency range without requiring any attenuation. The system includes plurality of drivers not uniformly arranged so that the relative velocity of the speaker follows the Legendre shading function. By making the driver density proportional to the Legendre function SSCBT allows each driver to play at max volume. The purpose behind Space Shaded Constant Beamwidth Transducer (SSCBT) is to replace attenuation with incremental spacing between the drivers. Alternatively, the angles each driver is placed by doubling the distance each driver is placed to accomplish the region which is 3 db lower. When the distance is doubled, the angle between each driver increases the further from 0 it is and is consistent with the Legendre function on its surface.

3 Claims, 6 Drawing Sheets

*3.1.1. Shading*

SPACE SHADED CONSTANT BEAMWIDTH TRANSDUCER

This application claims the benefit of U.S. Provisional Application Ser. No. 63/067618, filed on Aug. 19, 2020, hereby incorporated by reference as if set forth fully herein.

TECHNICAL FIELD

The invention generally relates to transducer design. One or more implementation relates generally to the loudspeaker design, and specifically using space shaded constant beam width transducer to have a radiation pattern which is constant over a wide frequency range without necessarily requiring any attenuation.

BACKGROUND OF INVENTION

A loudspeaker driver, or driver, is an electro-mechanical device that converts the electrical energy into acoustic energy. Multi driver speaker designs may produce their signals evenly, but only when observed on axis. However there will be a dip in the response over one or many frequency ranges, meaning at any other listening angle the system is no longer even or flat. In other words, these systems do not have a constant response over various listening positions. Even when listening on axis ceiling and floor reflections which do not originate on the listening axis combine with on axis sound. Even on axis sound does not have a constant response at varying distances. These past designs have a singular desirable listening location.

A constant beamwidth transducer (CBT) is a loudspeaker array that accomplishes broadband flat response uniformly on all listening angles. CBT design includes a spherical cap or curved arc containing uniformly spaced drivers shaded, using attenuation, so that the normal velocity is equivalent to the Legendre function $\rho_v$ (cos(θ)). This attenuation is perhaps the quintessential reason a consumer would deny purchase of a CBT, because removing this attenuation will increase the output of the array.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

Embodiments are directed towards loudspeaker to have a radiation pattern which is constant over a wide frequency range without requiring any attenuation. The system comprising plurality of drivers not uniformly arranged so that the relative velocity of the speaker follows the Legendre shading function mentioned above.

Space Shaded Constant-Beamwidth Transducer (SSCBT) design solves the problem of CBT whose main drawback is that not every driver has a velocity of 1. By making the driver density equivalent to the Legendre function SSCBT allows each driver to play at max volume. When designing a loudspeaker system or array it is known that the total number of drivers effects the efficiency to the point where doubling drivers will cause a 3 db gain. The purpose behind Space Shaded Constant Beamwidth Transducer (SSCBT) is to replace attenuation with incremental spacing between the drivers.

Implementation of CBT speakers approximate the Legendre function with 3 db steps. The first SSCBT configuration is designed on the principle that doubling the distance between the drivers will half the number of drivers in the given area resulting in an area that is 3 db lower than the other region of SSCBT which has an original distance, wherein original distance is the smallest distance between drivers. The distance was again doubled for each 3 db step to make −6 db, −9 db and −12 db sections. Driver density can be observed as the number of drivers in a particular region and that driver density is equivalent to the velocity of that same particular region. In an SSCBT array all drivers may play at equivalent velocity or be considered a portion of a driver if they do not and driver density is set to be equivalent to the Legendre shading function which is described in U.S. Pat. No. 8,170,233 which is hereby incorporated by reference. Measurements of the SSCBT configuration are equivalent or better than measurements of the existing CBT. This gives validity to the fact that driver density and velocity are equivalent. This use of driver density rather than purely attenuation is what separates SSCBT from CBT and allows SSCBT to use less drivers to accomplish the same goal, because attenuation is no longer necessary. SSCBT arrays may incorporate reflective loudspeaker array principles described in U.S. Pat. No. 7,684,574 which is hereby incorporated by reference.

Embodiments are directed towards loudspeaker to have a radiation pattern which is constant over a wide frequency range without requiring any attenuation. The computer readable medium storing instructions which, when executed, cause one or more processors to perform a function of SSCBT containing a plurality of drivers not uniformly arranged so that the relative velocity of the speaker follows the Legendre shading function mentioned above. Space Shaded Constant-Beamwidth Transducer (SSCBT) design solves the problem of CBT whose main drawback is that not every driver has a velocity of 1. By making the driver density equivalent to the Legendre function SSCBT allows each driver to play at max volume. When designing a loudspeaker system or array it is known that the total number of drivers effects the efficiency to the point where doubling drivers will cause a 3 db gain. The purpose behind Space Shaded Constant Beamwidth Transducer (SSCBT) is to replace attenuation with incremental spacing between the drivers.

Implementations of CBT speakers typically approximate the Legendre function with −3 db, −6 db and −9 db attenuation. SSCBT halves the number of drivers in a given area to achieve an area which is 3 db quieter without driver attenuation. Further halving continues by dividing by 2 again for each 3 db increment for one fourth as many driver, and one eight as many drivers and so on. The computer readable medium storing instructions which, when executed, cause one or more processors comprising where spacing can be implemented to achieve more accurate representations of the Legendre function. The number of drivers in a given angular region, or driver density, is proportional to the Legendre function in SSCBT. In one implementation attenuation was used in 4th driver of 4 driver design, which resulted 4th driver being a half driver. In this case there are half the number of drivers needed compared to CBT design which resulted in lighter speaker with fewer needed components.

BRIEF DESCRIPTION OF THE DRAWINGS

In the following drawings like reference numbers are used to refer to like elements. Although the following figures depict various examples, the one or more implementations are not limited to the examples depicted in the figures. All frequency response graphs are in logarithmic form, with 5 db divisions, and were conducted in a room with hard reflective surfaces with exception to the prior art.

DETAILED DESCRIPTION

It is found that number of drivers over a certain angular region is proportional to the velocity of that region which is found to be equal to the Legendre function.

$$P = \frac{n}{\Delta\theta} \sim \mu(\theta) = \rho_v(\cos(\theta)) \qquad \text{Equation 1}$$

Where

P is the driver density n is the number of drivers over a range of angles Δθ

μ(θ) is the radial velocity distribution

ρv(cos(θ))is the Legendre function of argument x and order v where v>0

Most CBT systems use a third order polynomial approximation. That can also be more easily used for SSCBT. Equation 2:

$$\mu(x)=1+0.0561\,x-1.3017\,x^2+0.457\,x^3$$

Where x=θ/$\theta_0$ where $\theta_0$ is the largest angle used in the array and is typically around 30° in the truncated approximation.

$$\frac{n \cdot g}{(x_2 - x_1)} = Avg(\mu(x)) = \frac{1}{(x_2 - x_1)} \int_{x_1}^{x_2} \mu - (x)dx \qquad \text{Equation 3}$$

Equates that the number of drivers in a given area $x_1$ through $x_2$ as the average number of drivers in that area, which is equivalent to the average velocity in that region where g is an equalizing constant making the formulas equal to each other. It can be simplified so that.

$$n \cdot g = \int_{\theta 1}^{\theta 2} \rho_v(\cos\theta) \qquad \text{Equation 4}$$

which is approximated to $$n \cdot g = \left. \frac{x(2285x^3 - 8678x^2 + 561x + 20000)}{20000} \right|_{x_1}^{x_2} \qquad \text{Equation 5}$$

There are multiple ways to solve for g. There are many ways to implement these equations.

Figure 3:
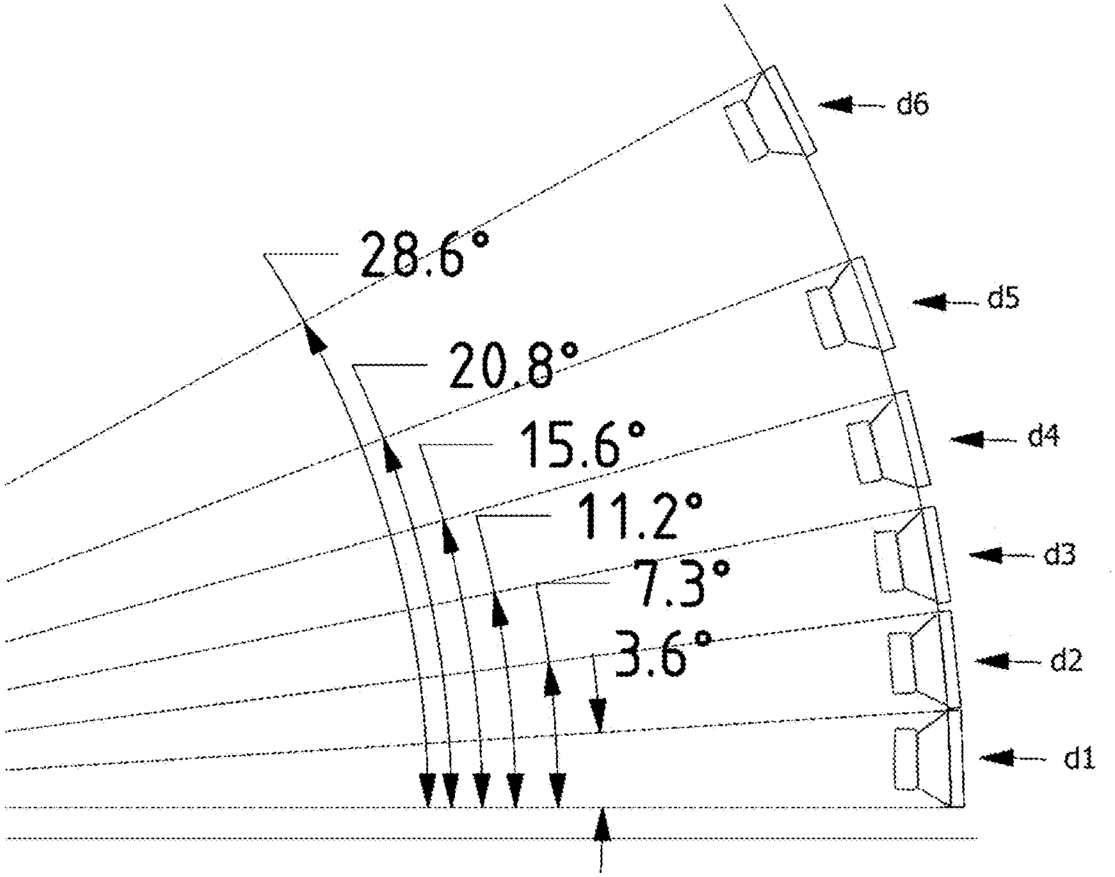
FIG. 3 A more accurate ground plane reflected SSCBT made with mathematical formulas FIG. 4 Another prototype SSCBT not using ground plane reflections FIG. 5 Frequency response of a ground plane reflected SSCBT on axis FIG. 6 Frequency response of a ground plane reflected SSCBT at 45 degrees vertical angle FIG. 7 A 48 driver CBT combined measurements in 1/12 octave shading FIG. 8 The 4 driver SSCBT combined measurements in 1/12 octave shading FIG. 9 A chart showing how to design a CBT with 3 db step approximation

In one implementation the largest edges of the drivers, the edge of the driver with the largest θ or x value, is used as x1 and x2 and set n=1. FIG. 3 shows the result of this implementation With the first drivers largest edge at 3.6° or x=0.1141 x1=0 and x2=0.1141. Solving the above equation gives g=0.1141. Continuing on setting the edge of the last driver equal to x1 and solving x2 until the equation can no longer possibly result in n=1 results in the table of drivers below.

| | | |
|---|---|---|
| d1 | X = 0.114 | 3.6° |
| d2 | X = 0.232 | 7.29° |
| d3 | X = 0.356 | 11.2° |
| d4 | X = 0.495 | 15.6° |
| d5 | X = 0.662 | 20.8° |
| d6 | X = 0.908 | 28.6° |

The result of this technique yields six drivers. Using the above equations 3 the final driver can be placed at 31.5° attenuated to a velocity of 0.2, since this is so small it is not needed. The number of drivers in an SSCBT comes out to number of drivers in a CBT multiplied by 0.7084, hence requiring less drivers. The total angle 31.5° is divided by 3.6° resulting in 8.75 drivers if CBT were to be used. The total number of SSCBT drivers 6.2 divided by the total number of CBT drivers is equal to 0.7086, very close to 0.7084. In practice fractional drivers are ideally avoided in real world construction. Even Keele's constructions required approximate approaches.

Further verification of this table of drivers can be done by observing the relative driver density and equating that to the velocity formula. As an example d4 is at x=0.495 and the velocity should be μ(x)=0.764. The distance from d3 and d4 is 0.139 and from d4 and d5 it is 0.167 giving an average of 0.153 the distance from 0 to d1 is 0.1141. 0.1141 divided by 0.153 is 0.745 which is very close to 0.764. Therefore, the space between the drivers drivers can be determined by observing the relative driver density and equating that to the velocity formula for a specific driver in the system.

$$J(n) = \frac{P(n)}{P(1)} = \frac{2L(d1)}{L(d(n-1)) + L(d(n+2))} = \mu(x) = \mu(\theta) \qquad \text{Equation 6}$$

Where J(n) is the relative driver density of driver n

P(n) is the driver density of driver n

L(dn) is the distance to driver n, either in terms of θ or the aforementioned x.

Equation 6 is appropriate for furthest edge calculations, center to center calculations need to multiply L(d1) by 2.

In other implementation 4 drivers were used and one of them is at half power so we will set n=3.5 and solve for the average between x=0 and x=1. It can be noted in this approach that.

$$n_T \cdot g = 0.7084$$

In this case g=0.2024 where $n_T$=3.5. Furthermore θ0=31.5 which is multiplied to the x values to find their angle. In this case the solution is easier to find if it is considered that from the center of the driver to the outer edge of the driver is one half of a driver. From Θ=0 to Θ=1.6 n should be equal to 0.5. Considering that the sum of the second half of the first driver and the first half of the second driver is 1 and n=1 for the next iteration of the equation. This technique is used to find the second and third driver and since the fourth driver has half power n=1 for its location as well. If the fourth driver was at full power n would equal 1.5 for the fourth driver with this technique.

Figure 1:
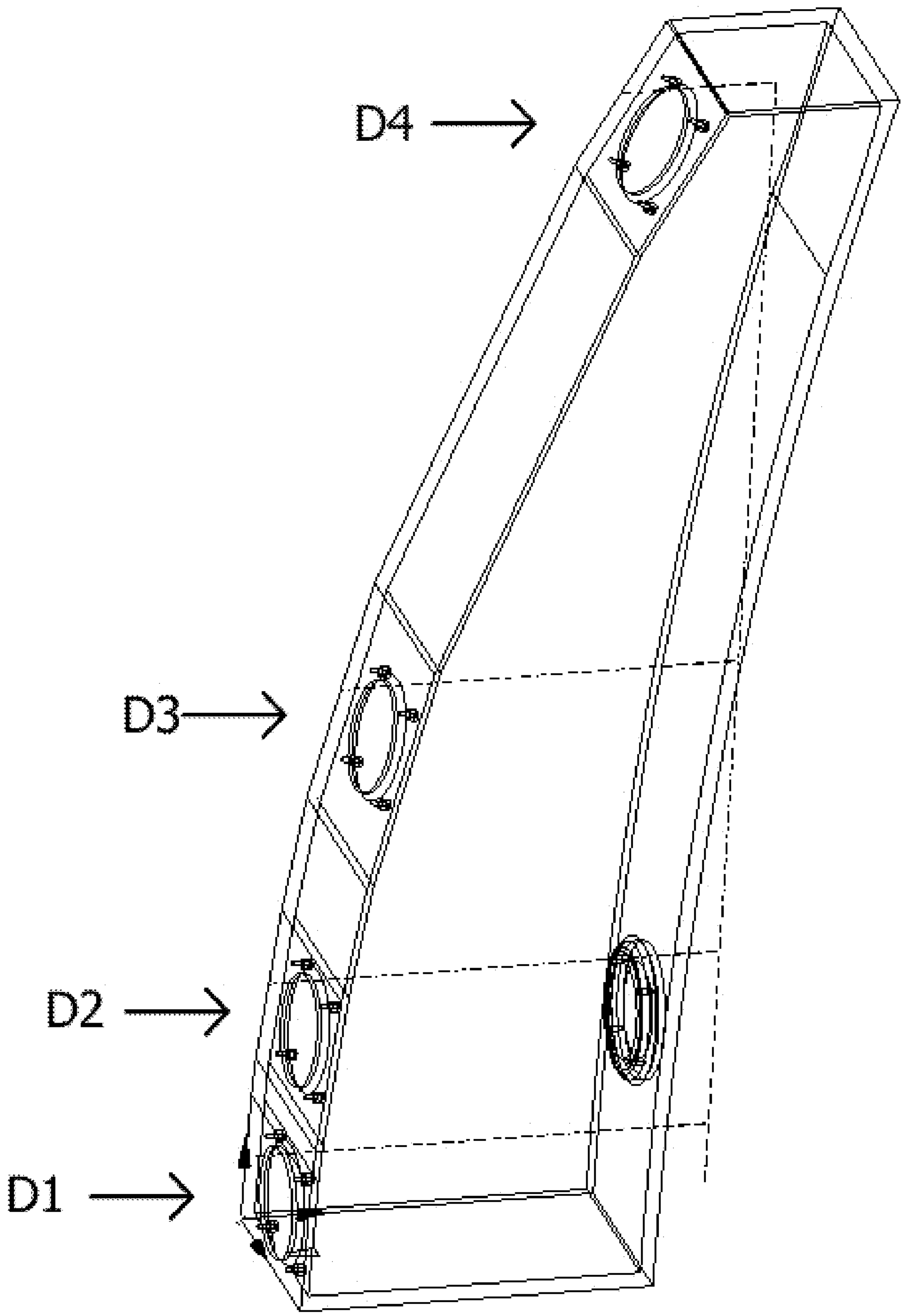
FIG. 1 A graphic of a ground plane reflection SSCBT
Figure 2:
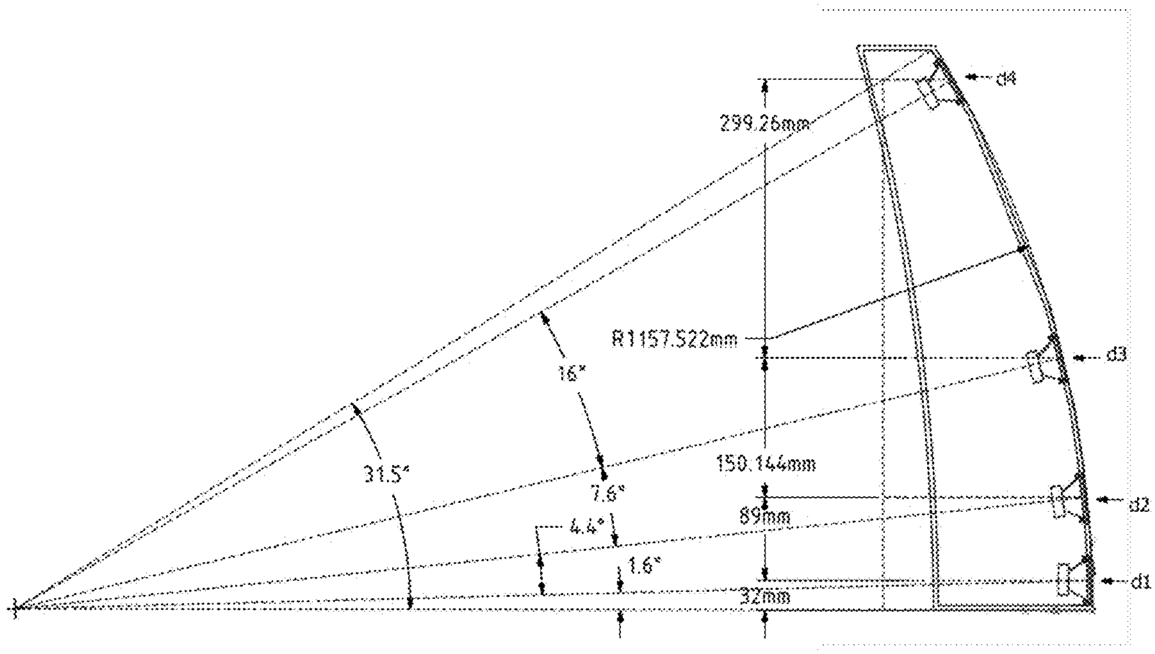
FIG. 2 Side view of the ground plane reflection SSCBT showing the angle as θ
Figure 4:
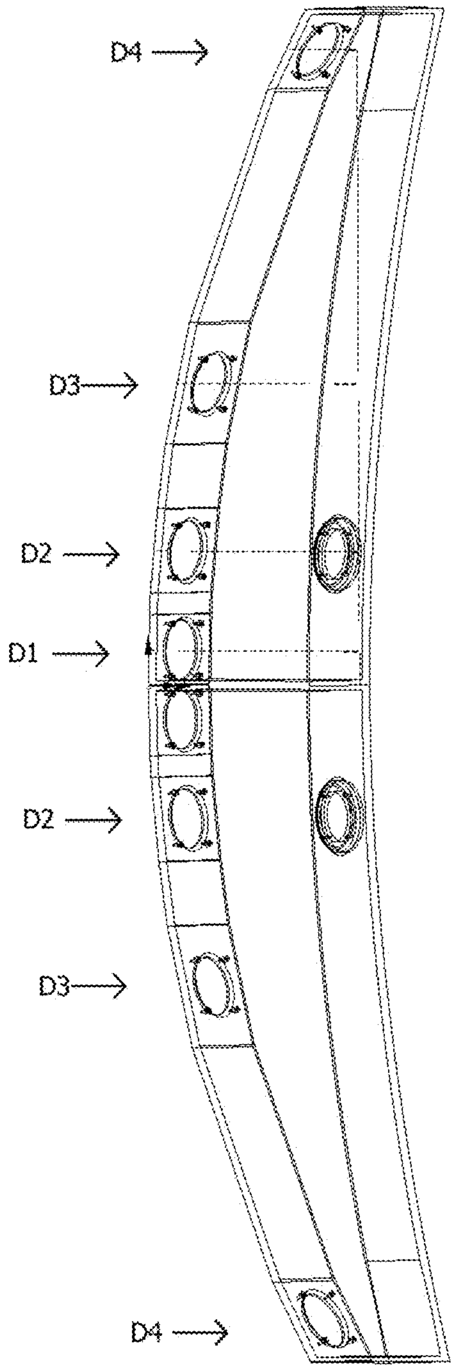
Figure 9:
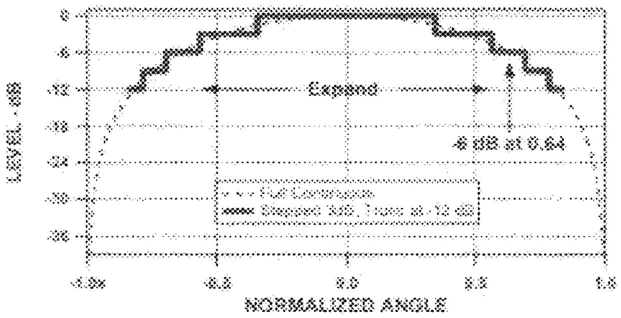

FIGS. 1, 2 and 4 illustrate an SSCBT configuration. FIG. 2 specifically shows the angles each driver is placed by doubling the distance each driver is placed to accomplish the region which is 3 db lower. The distance is doubled based on FIG. 9. The angle between each driver increases the further from 0 it is and is consistent with the Legendre function on its surface.

| | | |
|---|---|---|
| 0.0307 | 1.6° | 1.6° constructed on target |
| 0.259 | 8.171° | 6° constructed 2° off |
| 0.49 | 15.63° | 13.6° constructed-2° off |
| 0.84 | 26.5° | 29.6° construction 3° off |

The θ calculated shows the valued obtained using above equations and θ measured was obtained by by doubling the distance each driver is placed to accomplish the region which is 3 db lower. The distance is doubled based on FIG. 9.

Since both a 3.5 driver and 6 driver implementation are used on an array of the same length it is noted that if 6.2 drivers are used in SSCBT the output will be the same as an 8.75 driver CBT; however, if it is desired to reduce the price even further at the cost of output levels but maintain the same frequency loading region that the spacing can be changed with a different implementation of the formula. Or a larger array may be used with the same amount of drivers to decrease the minimum frequency that gains loading advantages. These loading advantages mean a more concentrated beam pattern making the sound reproduction louder within the beam, and that sound will also project farther. It is now known that the minimum effected frequency does not depend on the size or number of drivers in the array, but only on the total size of the array.

Figure 5:
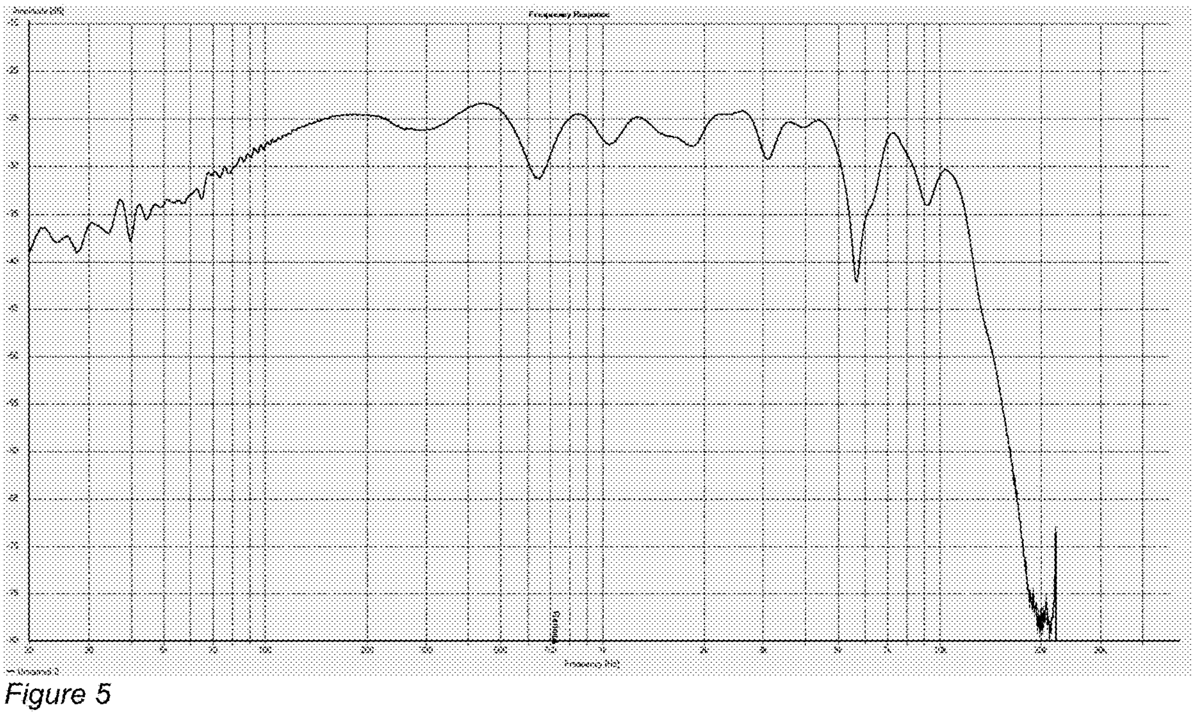
Figure 6:
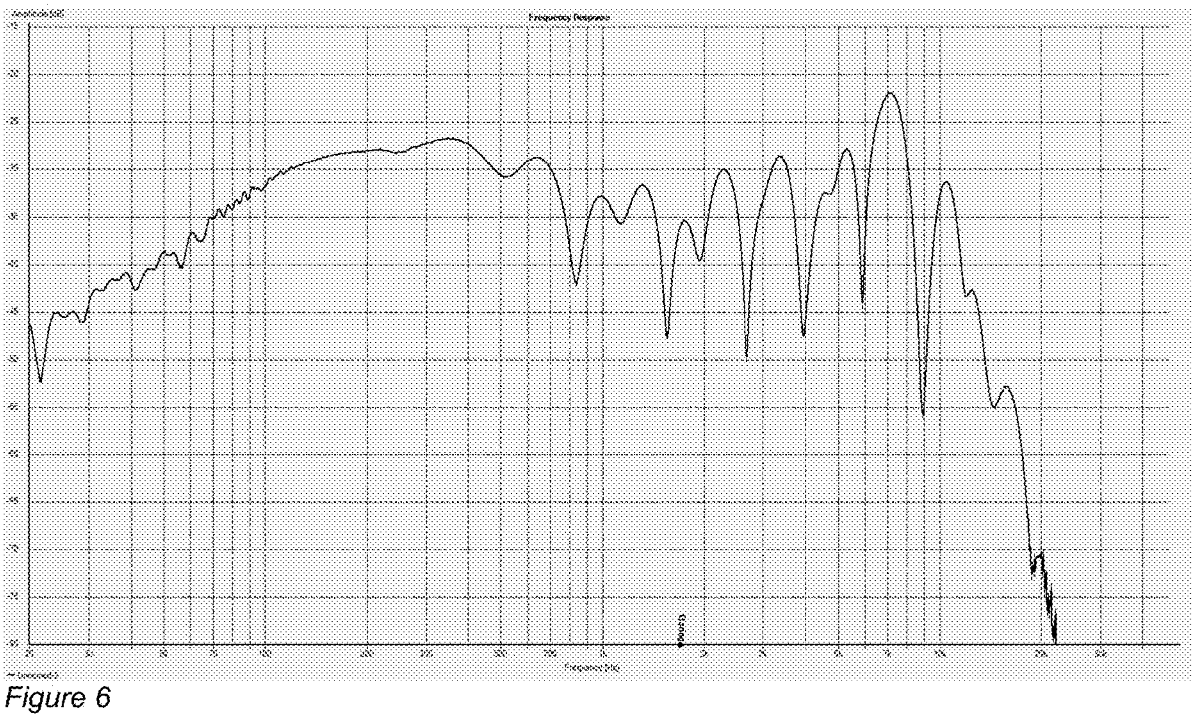

Given the length of the tested ground plane SSCBT we could expect a minimum frequency around 700 hz. FIGS. 5 and 6 illustrate the response of the SSCBT depicted in FIG. 2 at various vertical listening angles. We can see that the off axis responses show in FIG. 6 that there is a gradual 5 db decline that begins to occur around 700 hz. Additionally on FIG. 6 we can see the small valleys known as the combing effect on the SSCBT which shows improvement over non-cbt systems. These valleys are 15 db lower than average and are on par with a 48 driver CBT not pictured.

Figure 7:
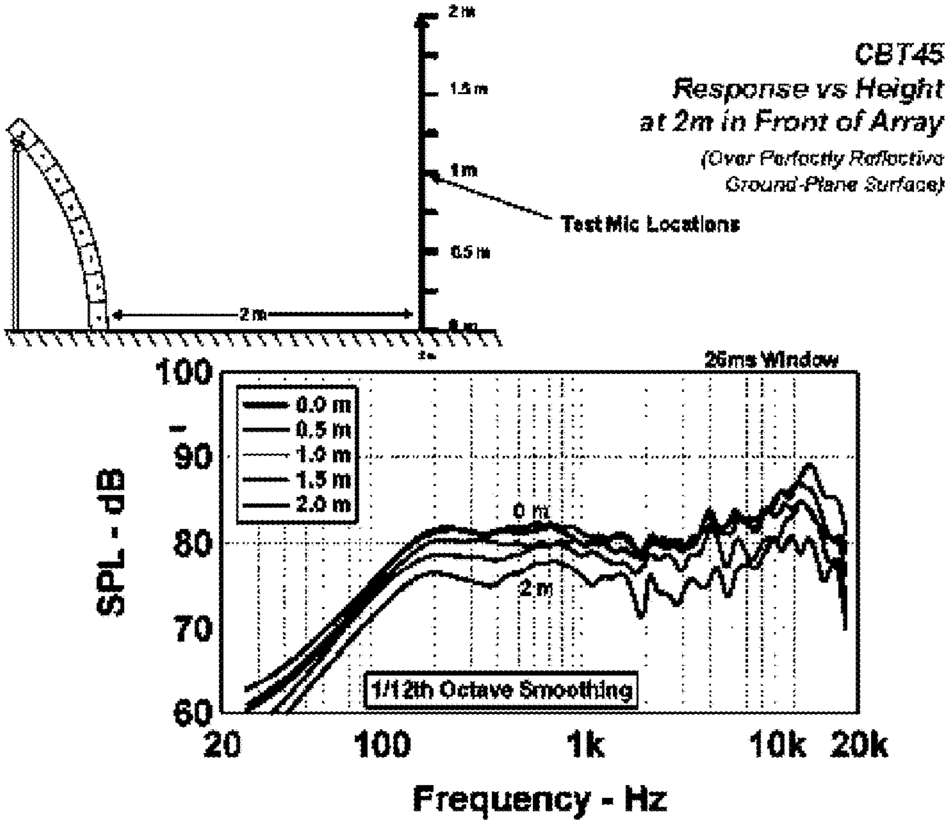
Figure 8:
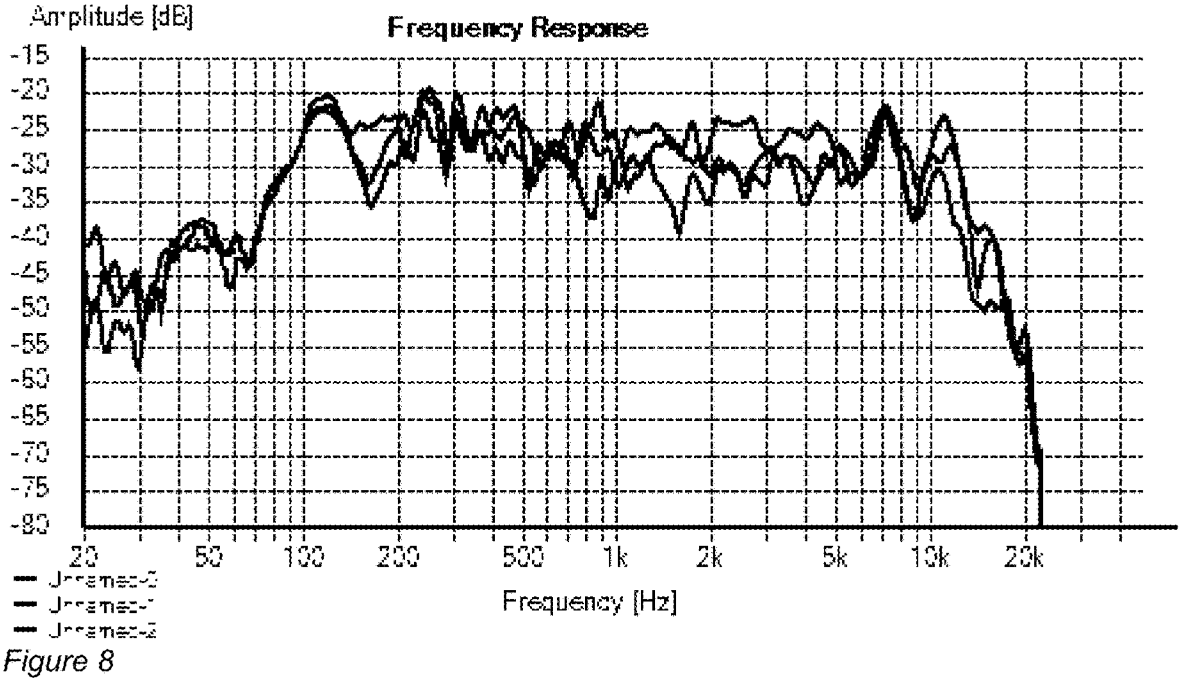

FIG. 7 is a response graph of the 48 driver CBT45k measured from 0 to 45o with 1/12th octave smoothing. FIG. 8 is a response graph of a 4 driver SSCBT depicted in FIG. 2 measured from 0 to 45o with 1/12th octave smoothing. The results obtained from the 4 driver SSCBT are indistinguishable from the results of the 48 driver CBT45k when considering the drivers used. The 4 driver SSCBT uses drivers which have limited response above 10,000 hz the response above 10,000 hz is indicative of the driver selection rather than SSCBT concepts. This will be an improved array design as it would allow the same result's using less drivers, leading to a more robust and cost effective design. It will also be much more appealing to consumers given that SSCBT has CBT quality while allowing all drivers to play at max volume.

The invention claimed is:

1. The Space Shaded Constant-Beamwidth Transducer (SSCBT) system comprising:

plurality of drivers arranged so that a radial velocity distribution of an array they form follows a Legendre shading function, wherein a driver density is proportional to the Legendre shading function, wherein in SSCBT system an attenuation is not required, and the attenuation is replaced with incremental spacing between the drivers, where spacing can be implemented to achieve more accurate representations of the Legendre function wherein the number of drivers over a certain angular region is proportional to the velocity of that region which is equal to the Legendre function $$\frac{n}{\Delta\theta} \sim \mu(\theta) = \rho_v(\cos(\theta))$$

wherein $$\frac{n}{\Delta\theta}$$

is the driver density where n is the number of drivers over a range of angles angle $\Delta\theta$ $\mu(\theta)$ is the radial velocity distribution $\rho_v(\cos(\theta))$ is the Legendre function of argument x and order v where v>0, wherein the number of drivers in a given area $x_1$ through $x_2$ is considered to be the average driver density in that area and is equal to the average velocity in that region $$\frac{n \cdot g}{(x_2 - x_1)} = Avg(\mu(x)) = \frac{1}{(x_2 - x_1)} \int_{x_1}^{x_2} \mu(x)dx$$

wherein n is the number of driver, g is the equalizing constant, wherein g is dependent on the total size and total number of drivers of the system, $x_1$ through $x_2$ are the regions over that area is considered the average driver density in that area, $\mu(x)$ is the velocity.

2. The Space Shaded Constant-Beamwidth Transducer (SSCBT) system of claim 1, wherein the number of drivers in the SSCBT is equal number of drivers in a CBT multiplied by 0.7084, hence requiring less drivers in the SSCBT.

3. The Space Shaded Constant-Beamwidth Transducer (SSCBT) system of claim 1, wherein the space between the drivers can be determined by observing the relative driver density and equating that to the velocity formula for a specific driver in the system.

* * * * *